(12) United States Patent
Ishikawa

(10) Patent No.: US 9,596,438 B2
(45) Date of Patent: Mar. 14, 2017

(54) INFORMATION PROCESSING SYSTEM LINKING INFORMATION PROCESSING APPARATUS WITH IMAGE PICKUP APPARATUS, INFORMATION PROCESSING APPARATUS, IMAGE PICKUP APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Akira Ishikawa, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 242 days.

(21) Appl. No.: 14/508,290

(22) Filed: Oct. 7, 2014

(65) Prior Publication Data
US 2015/0109465 A1    Apr. 23, 2015

(30) Foreign Application Priority Data
Oct. 23, 2013   (JP) ................................. 2013-220084

(51) Int. Cl.
*H04N 7/18*   (2006.01)
(52) U.S. Cl.
CPC .................................... *H04N 7/183* (2013.01)
(58) Field of Classification Search
CPC ............ H04N 7/183; G08B 13/196–13/19697
See application file for complete search history.

(56) References Cited

U.S. PATENT DOCUMENTS

| | | | | |
|---|---|---|---|---|
| 2006/0066891 A1* | 3/2006 | Ikeda | .................... | G06F 3/1222 358/1.15 |
| 2008/0231716 A1* | 9/2008 | Anderson | .......... | H04N 7/17318 348/211.3 |
| 2009/0204710 A1* | 8/2009 | Wada | .................. | G06F 21/6218 709/225 |
| 2012/0287460 A1* | 11/2012 | McMillin | ........... | H04N 1/00204 358/1.15 |
| 2013/0058658 A1* | 3/2013 | Friese | .................... | G08C 23/04 398/115 |
| 2014/0104630 A1* | 4/2014 | Baba | .................. | H04N 1/00323 358/1.13 |

(Continued)

FOREIGN PATENT DOCUMENTS

JP        2000333159 A     11/2000

*Primary Examiner* — Jason Flohre
(74) *Attorney, Agent, or Firm* — Rossi, Kimms & McDowell LLP

(57) ABSTRACT

An information processing apparatus that is capable of automatically performing setting for monitoring the information processing apparatus by an image pickup apparatus. The information processing apparatus is equipped with a display unit. A special pattern display unit displays a predetermined special pattern on the display unit. A reception unit receives a response showing that the special pattern is detected from the image pickup apparatus that detects the special pattern displayed on the display unit by the special pattern display unit. A setting unit sets the image pickup apparatus that transmits the response as an image pickup apparatus used to monitor the information processing apparatus when the reception unit receives the response.

5 Claims, 8 Drawing Sheets

(56) References Cited

U.S. PATENT DOCUMENTS

| | | | |
|---|---|---|---|
| 2014/0218765 A1* | 8/2014 | Sawayanagi | H04N 1/00111 358/1.15 |
| 2014/0239060 A1* | 8/2014 | Thomas | G01N 35/00732 235/375 |
| 2015/0047024 A1* | 2/2015 | Park | G06Q 30/0645 726/19 |
| 2015/0379491 A1* | 12/2015 | Ma | G07F 19/209 235/379 |

* cited by examiner

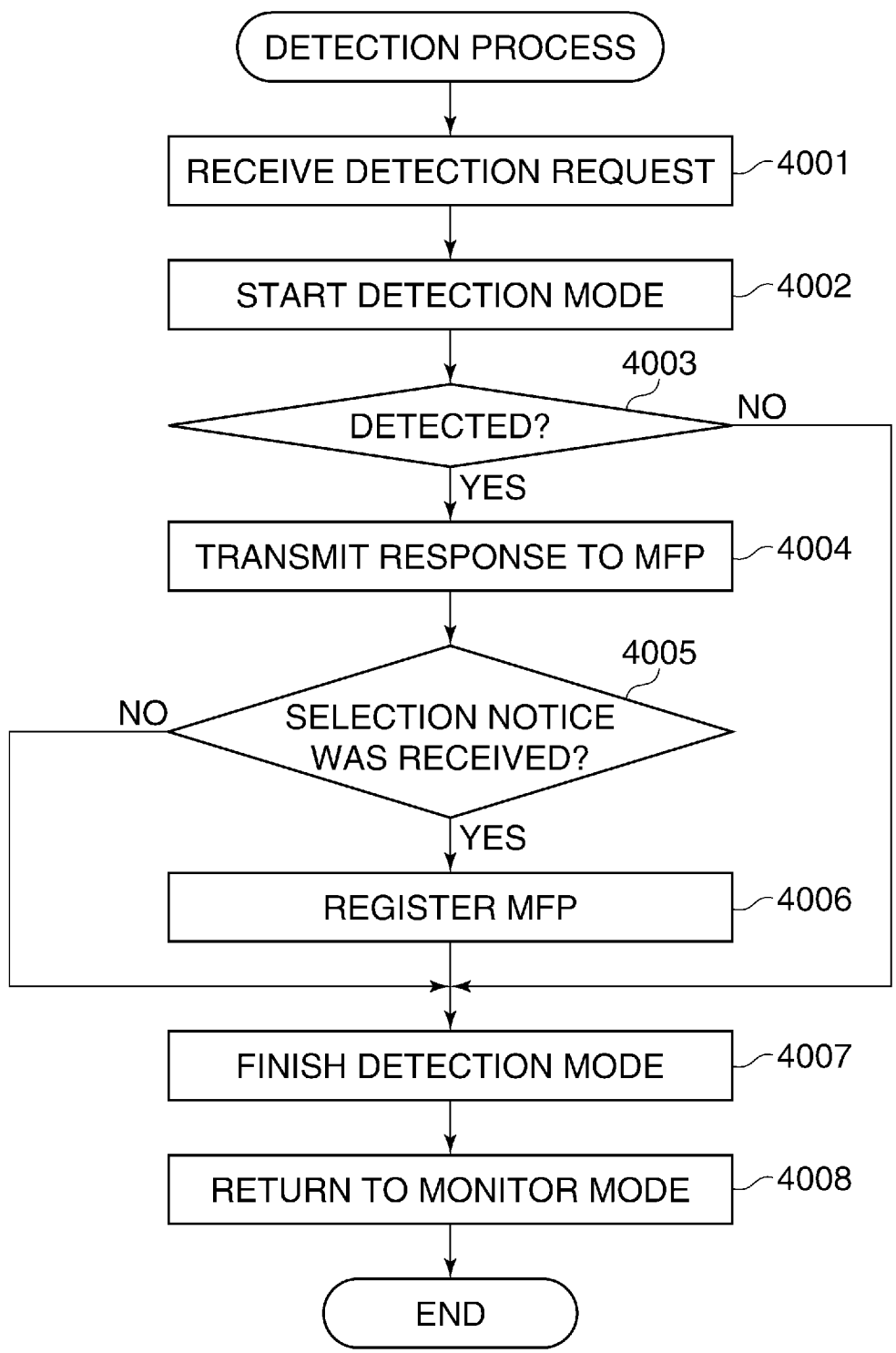

INFORMATION PROCESSING SYSTEM LINKING INFORMATION PROCESSING APPARATUS WITH IMAGE PICKUP APPARATUS, INFORMATION PROCESSING APPARATUS, IMAGE PICKUP APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an information processing system that links an information processing apparatus with an image pickup apparatus, the information processing apparatus, the image pickup apparatus, a control method therefor, and a storage medium storing a control program therefor.

Description of the Related Art

With improvement in count ability and image quality of a network camera, various applications of a network camera other than recording for the purpose of monitoring are proposed. Moreover, functions of a multifunctional peripheral device are complicated. For example, a function that is not achieved by a multifunctional peripheral device solely is also required in order to improve office productivity.

There is a proposal that improves functionality of a multifunctional peripheral device by linking a multifunctional peripheral device with a network camera.

For example, a multifunctional peripheral device has a function for shifting to a power saving mode in nonuse. Since power consumption in the power saving mode should be reduced as small as possible, it is preferable to shut down electric power supplied to devices including a user detection sensor. However, if the electric power supplied to the user detection sensor is shut down, the multifunctional peripheral device cannot detect a user's approach.

Accordingly, if the electric power supplied to the user detection sensor is shut down, a problem that a user cannot use the multifunctional peripheral device immediately when the user wants to use occurs.

There is a proposed functional linkage that returns a multifunctional peripheral device from the power saving mode by transmitting a wake-up packet to the target multifunctional peripheral device when a network camera detects a user's approach.

When this functional linkage will be performed, it is necessary to set a target multifunctional peripheral device that is monitored by a network camera, a monitoring method, and a notifying method. Since user interface devices, such as a liquid crystal panel and a keyboard, are not mounted in a network camera, this setting is complicated.

There is a proposed automatic setting technique that calculates priorities of surveillance cameras on the basis of characteristics of an object when the surveillance cameras detect the object, and that monitors a video signal from a surveillance camera with the highest priority (for example, see Japanese Laid-Open Patent Publication (Kokai) No. 2000-333159 (JP 2000-333159A)).

In such a technical background, it is required to set the network address and the position in the taken image of the multifunctional peripheral device of the monitoring target to the network cameras, in order to return the multifunctional peripheral device from the power saving mode by the functional linkage.

If one of the address and the position has been set up beforehand, it is possible to search for information about the other on the basis of the set information. However, the information about them is not usually set up at the time of initial setting, such as installation time.

SUMMARY OF THE INVENTION

The present invention provide an information processing system, an information processing apparatus, an image pickup apparatus, a control method therefor, and a storage medium storing a control program therefor, which are capable of automatically performing setting for monitoring the information processing apparatus by the image pickup apparatus.

Accordingly, a first aspect of the present invention provides an information processing apparatus equipped with a display unit comprising a special pattern display unit configured to display a predetermined special pattern on the display unit, a reception unit configured to receive a response showing that the special pattern is detected from an image pickup apparatus that detects the special pattern displayed on the display unit by the special pattern display unit, and a setting unit configured to set the image pickup apparatus that transmits the response as an image pickup apparatus used to monitor the information processing apparatus when the reception unit receives the response.

Accordingly, a second aspect of the present invention provides an image pickup apparatus comprising a detection unit configured to detect a special pattern displayed on a display unit of an information processing apparatus in taken image data obtained by taking a subject, a transmission unit configured to transmit a response showing that the special pattern is detected to the information processing apparatus when the detection unit detects the special pattern, and a registration unit configured to register the information processing apparatus to which the response is transmitted as an information processing apparatus that is monitored by the image pickup apparatus.

Accordingly, a third aspect of the present invention provides an information processing system comprising the information processing apparatus of the first aspect, and the image pickup apparatus of the second aspect.

Accordingly, a fourth aspect of the present invention provides a control method for an information processing apparatus equipped with a display unit comprising a special pattern display step of displaying a predetermined special pattern on the display unit, a reception step of receiving a response showing that the special pattern is detected from an image pickup apparatus that detects the special pattern displayed on the display unit in the special pattern display step, and a setting step of setting the image pickup apparatus that transmits the response as an image pickup apparatus used to monitor the information processing apparatus when the response is received in the reception step.

Accordingly, a fifth aspect of the present invention provides a control method for an image pickup apparatus comprising a detection step of detecting a special pattern displayed on a display unit of an information processing apparatus in taken image data obtained by taking a subject, a transmission step of transmitting a response showing that the special pattern is detected to the information processing apparatus when the special pattern is detected in the detection step, and a registration step of registering the information processing apparatus to which the response is transmitted as an information processing apparatus that is monitored by the image pickup apparatus.

Accordingly, a sixth aspect of the present invention provides a non-transitory computer-readable storage medium storing a control program causing a computer to execute the control method of the fourth aspect.

Accordingly, a seventh aspect of the present invention provides a non-transitory computer-readable storage medium storing a control program causing a computer to execute the control method of the fifth aspect.

According to the present invention, since the predetermined special pattern is displayed on the display unit and the image pickup apparatus that transmitted the response is set as an image pickup apparatus used to monitor the information processing apparatus when the response showing that the special pattern was detected is received from the image pickup apparatus, the setting for the image pickup apparatus to monitor the information processing apparatus is automatically performed.

Further features of the present invention will become apparent from the following description of exemplary embodiments with reference to the attached drawings.

BRIEF DESCRIPTION OF THE DRAWINGS

FIG. 8 is a flowchart showing procedures of the modified example of the detection process executed by the CPU of the network camera shown in FIG. 3.

DESCRIPTION OF THE EMBODIMENTS

Hereafter, embodiments according to the present invention will be described in detail with reference to the drawings.

Figure 1:
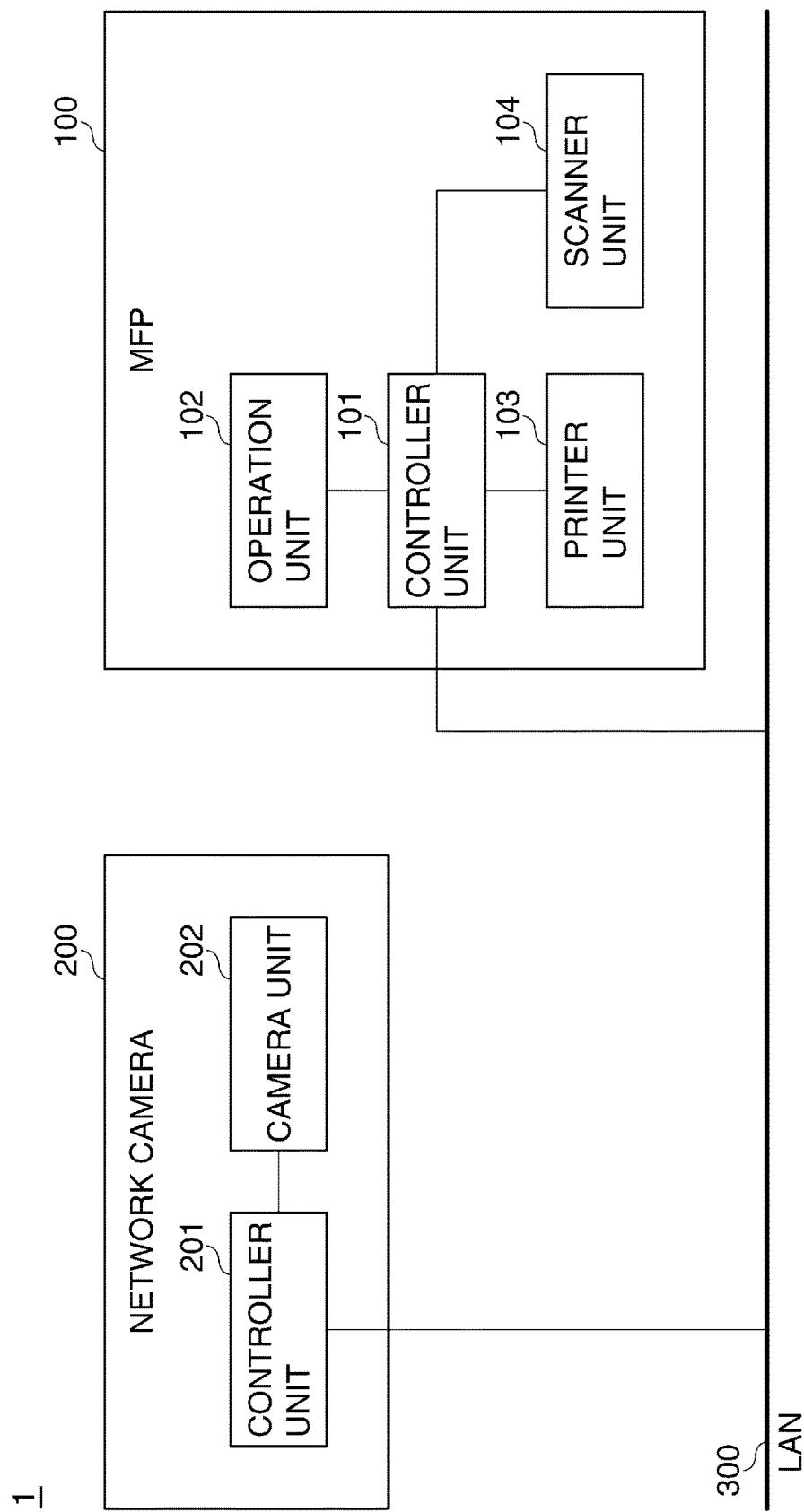
FIG. 1 is a block diagram schematically showing a configuration of an information processing system according to an embodiment of the present invention.

FIG. 1 is a block diagram schematically showing a configuration of an information processing system 1 according to an embodiment of the present invention.

As shown in FIG. 1, the information processing system 1 consist of an image forming apparatus (referred to as an "MFP", hereafter) 100 as an information processing apparatus and a network camera 200 as an image pickup apparatus, which are connected through a LAN 300.

The MFP 100 consists of a controller unit 101, an operation unit 102, a printer unit 103, and a scanner unit 104.

The controller unit 101 controls the entire MFP 100. The operation unit 102 is connected to the controller unit 101, displays a variety of information to a user, and receives a user's operational input. The printer unit 103 is connected to the controller unit 101, and prints an image onto a medium, such as a paper sheet. The scanner unit 104 connects to the controller unit 101, reads an original image, and outputs image data that shows the original image.

The network camera 200 consists of a controller unit 201 and a camera unit 202.

The controller unit 201 controls the entire network camera 200. The camera unit 202 is connected to the controller unit 201, and outputs taken image data.

Figure 2:
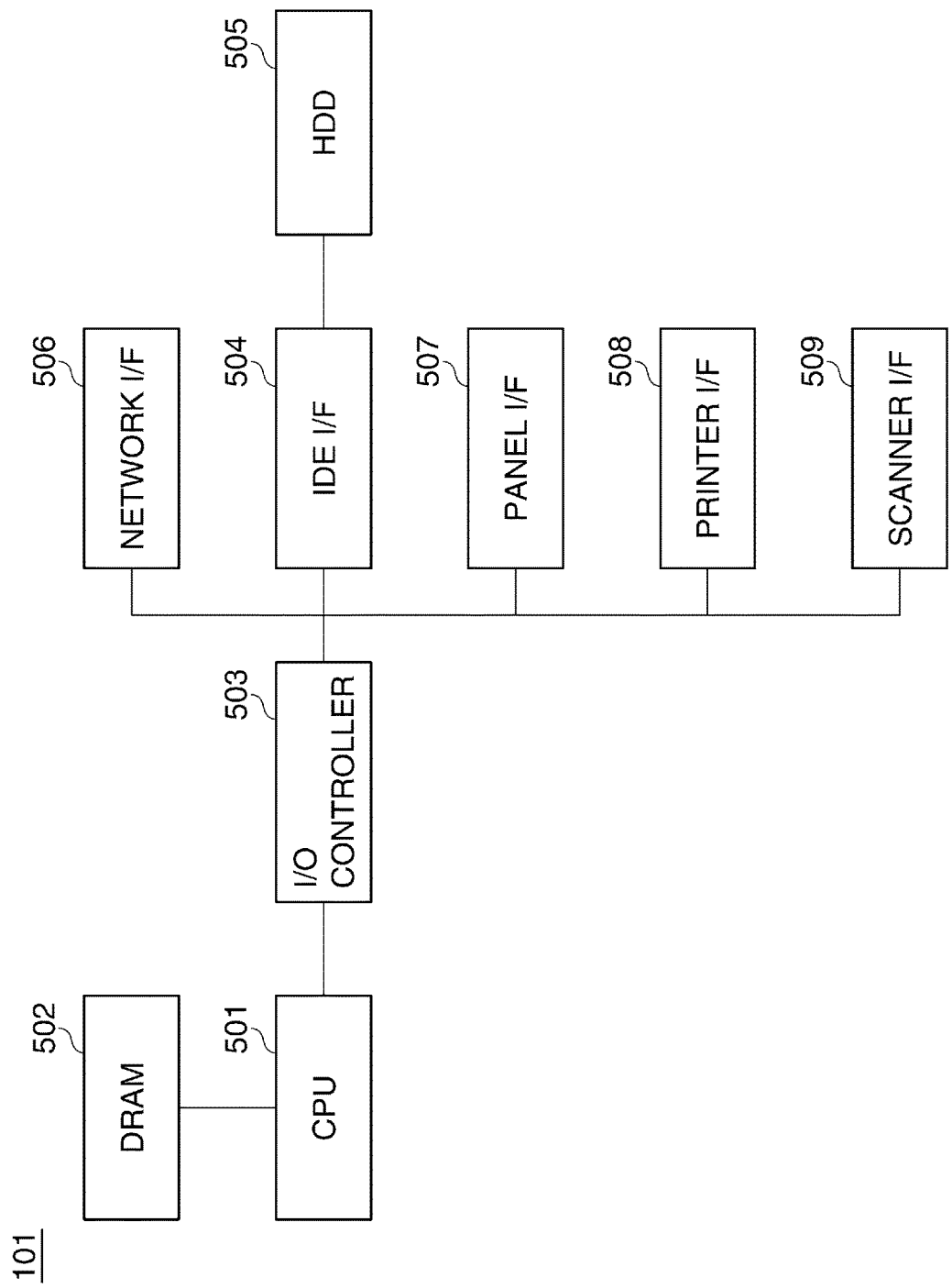
FIG. 2 is a block diagram schematically showing a configuration of a controller unit of an MFP shown in FIG. 1.

FIG. 2 is a block diagram schematically showing a configuration of the controller unit 101 of the MFP 100 shown in FIG. 1.

As shown in FIG. 2, the controller unit 101, consists of a CPU 501, a DRAM 502, an I/O controller 503, a network interface (I/F) 506, an IDE (Integrated Device Electronics) interface 504, a panel interface 507, a printer interface 508, a scanner interface 509, and an HDD 505.

The CPU 501 controls the entire MFP 100 by controlling sections of the controller unit 101. This CPU 501 is connected to the DRAM 502 through a bus.

The DRAM 502 is used by the CPU 501 as a work memory that temporarily stores program data indicating an operation instruction during a calculation by the CPU 501 and data of a processing target.

The CPU 501 is connected to the I/O controller 503 through the bus. The I/O controller 503 performs input/output of each unit according to an instruction by the CPU 501. The I/O controller 503 is connected to the IDE interface 504, which is connected to the HDD 505.

The CPU 501 uses the HDD 505 in order to store a program to achieve a function as an image forming apparatus, read document data, etc. permanently.

The network interface 506 is connected to the I/O controller 503. The CPU 501 communicates with the LAN 300 through the network interface 506.

The panel interface 507 is connected to the I/O controller 503. The CPU 501 displays various information on the operation unit 102 and detects an operational input content by a user through the panel interface 507.

The printer interface 508 is connected to the I/O controller 503. The CPU 501 controls the printer unit 103 through the printer interface 508.

The scanner interface 509 is connected to the I/O controller 503. The CPU 501 controls the scanner unit 104 through the scanner interface 509.

When a copy function is performed in the configuration mentioned above, the CPU 501 reads a program from the HDD 505 through the IDE interface 504 and expands it onto the DRAM 502.

Then, the CPU 501 detects a copy instruction from a user to the operation unit 102 through the panel interface 507 according to the program expanded to the DRAM 502.

When detecting the copy instruction, the CPU 501 stores the image data that the scanner unit 104 outputs by reading an original to the DRAM 502.

The CPU 501 applies a color conversion process etc. that are suitable for printing to the image data stored in the DRAM 502. The CPU 501 transmits the image data stored in the DRAM 502 to the printer unit 103 through the printer interface 508, and prints it on a medium.

Figure 3:
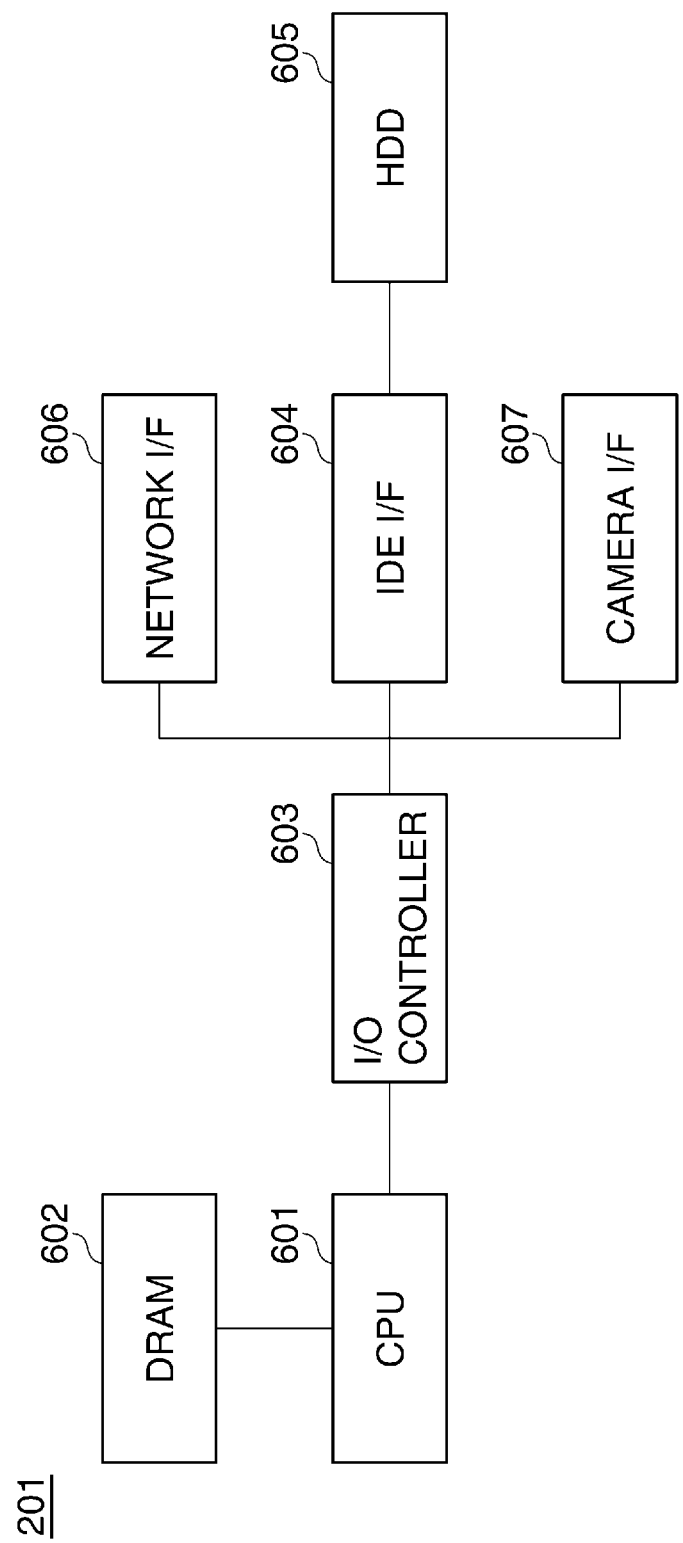
FIG. 3 is a block diagram schematically showing a configuration of a controller unit of a network camera shown in FIG. 1.

FIG. 3 is a block diagram schematically showing a configuration of the controller unit 201 of the network camera 200 shown in FIG. 1.

As shown in FIG. 3, the controller unit 201 consists of a CPU 601, a DRAM 602, an I/O controller 603, a network interface 606, an IDE interface 604, a camera interface 607, and an HDD 605.

The CPU 601 controls the entire network camera 200 by controlling sections of the controller unit 201.

This CPU 601 is connected to the DRAM 602 through a bus.

The DRAM 602 is used by the CPU 601 as a work memory that temporarily stores program data indicating an operation instruction during a calculation by the CPU 601 and data of a processing target.

The CPU 601 is connected to the I/O controller 603 through the bus. The I/O controller 603 performs input/output of each unit according to an instruction by the CPU 601. The I/O controller 603 is connected to the IDE interface 604, which is connected to the HDD 605.

The CPU 601 uses the HDD 605 in order to store a program to achieve a function as a network camera, taken image data obtained by taking a subject, etc. permanently.

The network interface 606 is connected to the I/O controller 603. The CPU 601 communicates with the LAN 300 through the network interface 606.

The camera interface 607 is connected to the I/O controller 603. The CPU 601 achieves a taking process using the camera unit 202 through the camera interface 607.

When a monitor video storing function is performed in the configuration mentioned above, the CPU 601 reads a program from the HDD 605 through the IDE interface 604 and expands it onto the DRAM 602.

Then, the CPU 601 instructs the camera unit 202 to store video image through the camera interface 607 according to the program expanded to the DRAM 602. When receiving the taken image data from the camera unit 202, the CPU 601 stores it to the HDD 605.

Next, operations when the MFP 100 links with the network camera 200 will be described. When the MFP 100 is returned from the power saving mode by means of the linkage of the MFP 100 and the network camera 200, the CPU 601 mounted in the network camera 200 operates in a monitor mode to monitor according to linkage setting stored in the HDD 605.

Information showing a correlation between position and size of a detection frame defined within the taking area and the network address of the MFP 100 is needed in order to perform the linkage setting.

The CPU 601 sequentially expands the taken image data received from the camera unit 202 to the DRAM 602, and determines whether a person exists in the detection frame. When there is a person, the CPU 601 determines that a person approaches the MFP 100, and transmits a wake-up packet to the MFP 100.

When the MFP 100 receives the wake-up packet, the CPU 501 instructs to execute a starting process to the respective sections connected to the IDE interface 504, the panel interface 507, the printer interface 508, and the scanner interface 509.

When the starting process is instructed, the HDD 505, the operation unit 102, the printer unit 103, and the scanner unit 104 perform the starting process, and the MFP 100 returns from the power saving mode.

Figure 4:
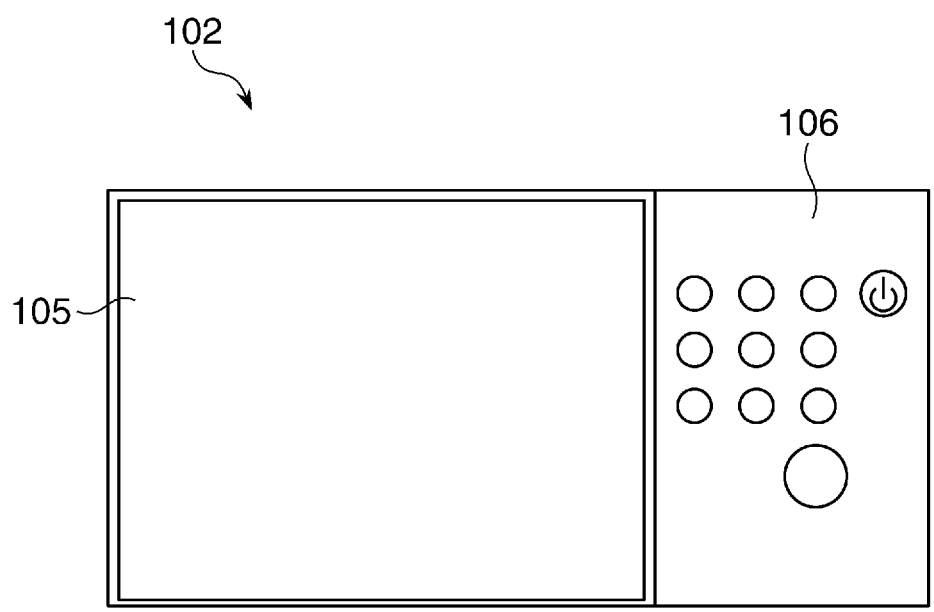
FIG. 4 is a plan view schematically showing a configuration of an operation unit of the MFP shown in FIG. 1.

FIG. 4 is a plan view schematically showing a configuration of the operation unit 102 of the MFP 100 shown in FIG. 1.

As shown in FIG. 4, the operation unit 102 consist of a display unit 105 and a keyboard 106.

A touch panel is mounted on a surface of the display unit 105. The display unit 105 displays a status screen that shows a status of the MFP 100, a selection screen for selecting functions, such as a copying function and a facsimile function, and a setting screen through which information needed to execute the function selected on the selection screen is inputted.

The keyboard 106 consists of an execution key for executing a function, a key for shifting to the power saving mode, and a ten-key pad for inputting a numeral, etc.

Moreover, in this embodiment, the display unit 105 displays a predetermined special pattern. The special pattern makes the network camera 200 detect the MFP 100. For example, the special pattern is displayed by painting the entire area of the display unit 105 with colors of #000000 and #FFFFFF in the RGB model alternately and repeatedly in fixed intervals. Moreover, a predetermined graphic may be displayed as another special pattern.

Furthermore, the special pattern may be displayed using light emitting buttons in the keyboard 106 or other luminous bodies, such as LEDs, mounted in the MFP 100 in place of the display unit 105. For example, an LED may display the special pattern using the Morse code etc. Moreover, non-visible light may be used. For example, a configuration in which an IR sensor is mounted in the network camera 200 and an IR LED is mounted in the MFP 100 may be employed.

Figure 5:
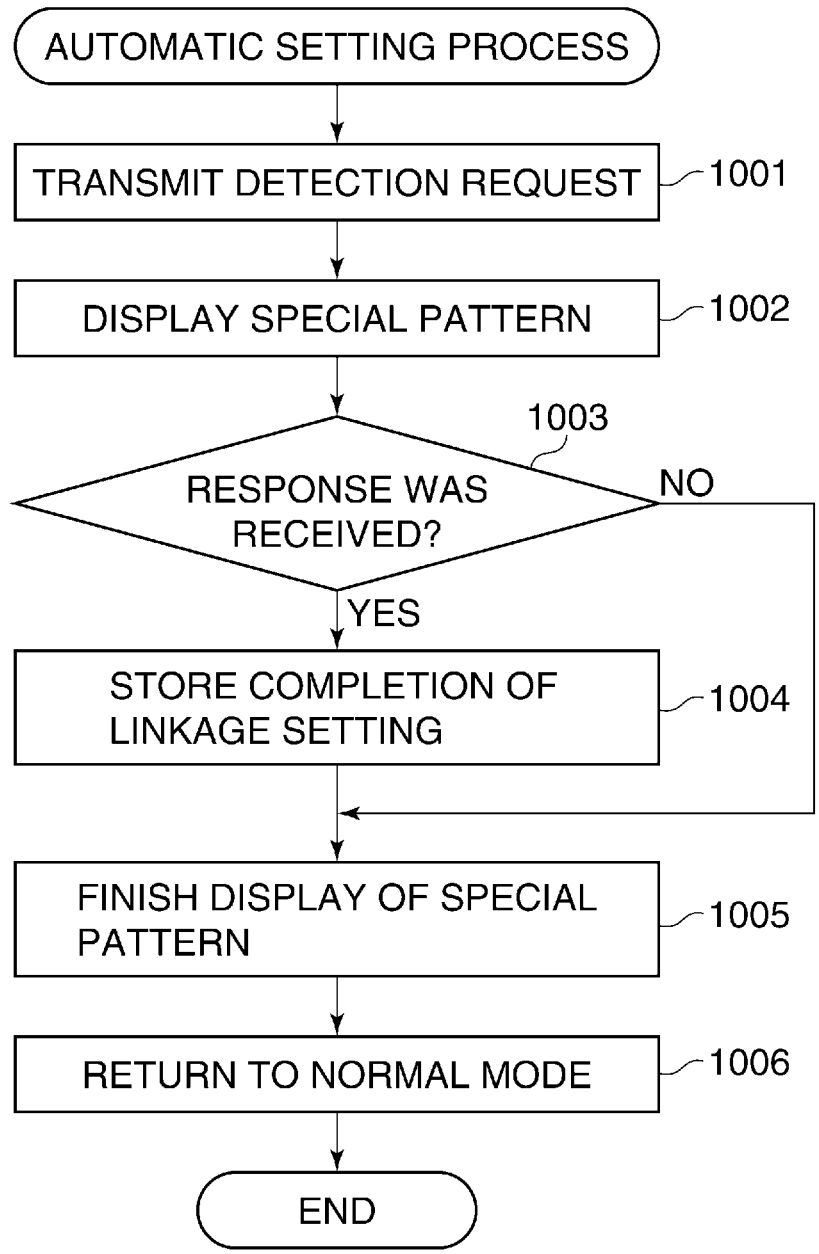
FIG. 5 is a flowchart showing procedures of an automatic setting process executed by a CPU of the MFP shown in FIG. 2.

FIG. 5 is a flowchart showing procedures of an automatic setting process executed by the CPU 501 of the MFP 100 shown in FIG. 2.

As shown in FIG. 5, when a user instructs the MFP 100 about the linkage setting, the CPU 501 transmits a detection request to the LAN 300 by broadcasting (step 1001). This detection request requires network cameras including the network camera 200 connected to the LAN 300 to detect the MFP 100. It should be noted that the detection request may be transmitted by multicasting instead of broadcasting, when the IP address of the target network camera is known beforehand.

Next, the CPU 501 displays the above-mentioned special pattern on the display unit 105 (step 1002). This step 1002 corresponds to a special pattern display unit.

Then, the CPU 501 determines whether a response was received (step 1003). When detecting the special pattern displayed on the display unit 105, the network camera 200 transmits the response. This step 1003 corresponds to a reception unit.

As a result of the determination in the step 1003, when a response was not received (NO in the step 1003), the process proceeds to step 1005.

On the other hand, as a result of the determination in the step 1003, when the response was received (YES in the step 1003), since the linkage succeeded, the CPU 501 sets the linkage with the network camera, which transmitted the response, and stores the information showing that the linkage was set together with the information identifying the network camera to the HDD 505 (step 1004). This step 1004 corresponds to a setting unit that sets the network camera that transmits a response as a network camera that monitors the MFP 100, when the response is received. Moreover, a fixed IP address or a MAC address may be used as the information identifying the network camera instead of the network address used in this embodiment.

Then, the CPU 501 finishes the display of the special pattern (step 1005), returns to a normal mode (step 1006), and finishes this process.

Figure 6:
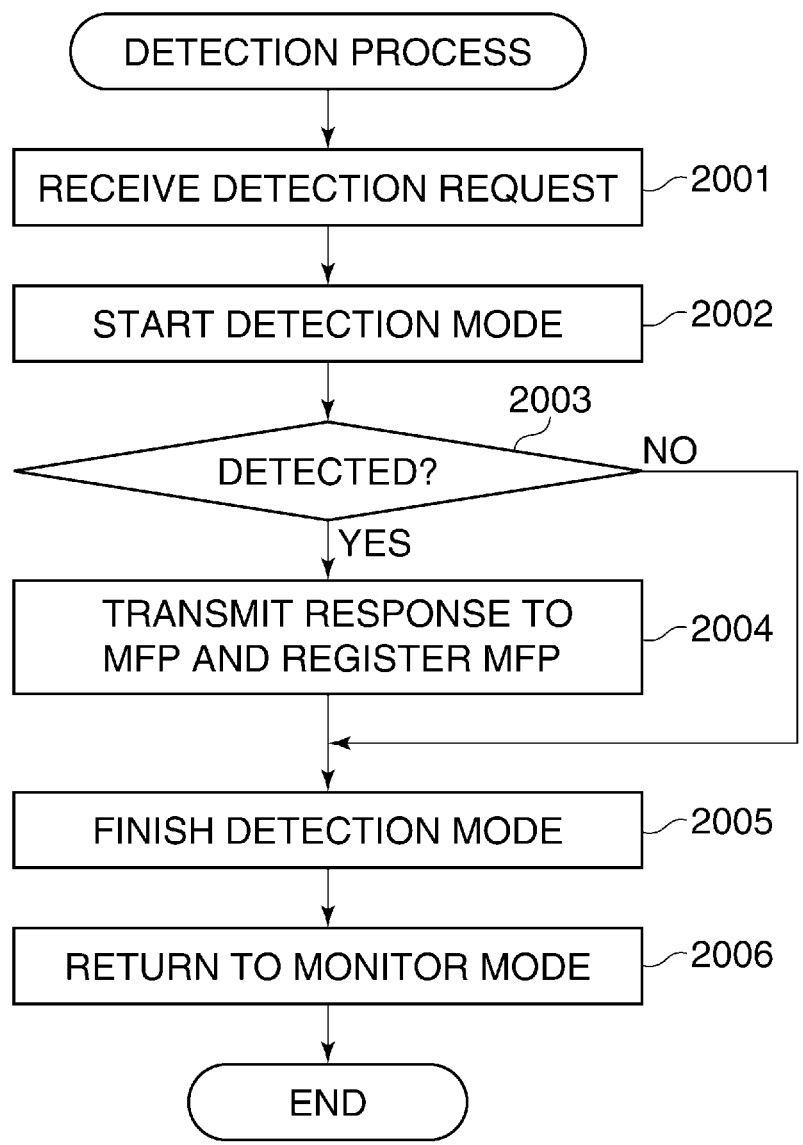
FIG. 6 is a flowchart showing procedures of a detection process executed by a CPU of the network camera shown in FIG. 3.

FIG. 6 is a flowchart showing procedures of a detection process executed by the CPU 601 of the network camera 200 shown in FIG. 3.

This detection process of the network camera 200 forms a pair corresponds to the automatic setting process in FIG. 5.

As shown in FIG. 6, when receiving a detection request (step 2001), the CPU 601 starts a detection mode (step 2002). In this detection mode, the network camera 200 detects the special pattern in the taken image data that the camera unit 202 takes the subject. The above-mentioned step 2002 corresponds to a detection unit that detects a special pattern displayed on the display unit 105 of the MFP 100 in taken image data obtained by taking a subject.

Next, the CPU 601 determines whether the special pattern was detected in the taken image data (step 2003).

As a result of the determination in the step 2003, when the special pattern was not detected (NO in the step 2003), the process proceeds to step 2005.

On the other hand, as a result of the determination in the step 2003, when the special pattern was detected (YES in the step 2003), the CPU 601 transmits the above-mentioned response to the MFP 100, and registers the MFP 100 using the information identifying the MFP 100 (step 2004). This step 2004 corresponds to a transmission unit, and also corresponds to a registration unit that registers information identifying an MFP to which a response is transmitted as an MFP that is monitored by a network camera. Moreover, a fixed IP address or a MAC address may be used as the information identifying the MFP 100 instead of the network address used in this embodiment.

This response is transmitted to the network address of the MFP 100 included in the broadcast packet that the MFP 100 transmitted. Moreover, the registration of the MFP 100 means storing the network address of the MFP 100 to the HDD 605 as a monitoring target.

Next, the CPU 601 finishes a detection mode (step 2005), returns to the monitor mode (step 2006), and finishes this process.

The network camera 200 that monitors the MFP 100 is automatically set up according to the processes shown in FIG. 5 and FIG. 6.

Although the MFP 100 will be monitored by the network camera 200 that responded according to the process in FIG. 5, the network camera 200 that is used to monitor may be selected with the MFP 100.

A modified example that selects the network camera 200 used to monitor will be described.

In this modified example, a plurality of special patterns are prepared, and a unique ID is assigned to each of the special patterns. Then, pairs each of which consists of image data showing a special pattern and an ID are beforehand stored to the HDD 605 of the network camera 200.

When detecting the special patter in the taken image data, the network camera 200 transmits a response including image data showing the special pattern in the taken image data to the MFP 100.

Figure 7:
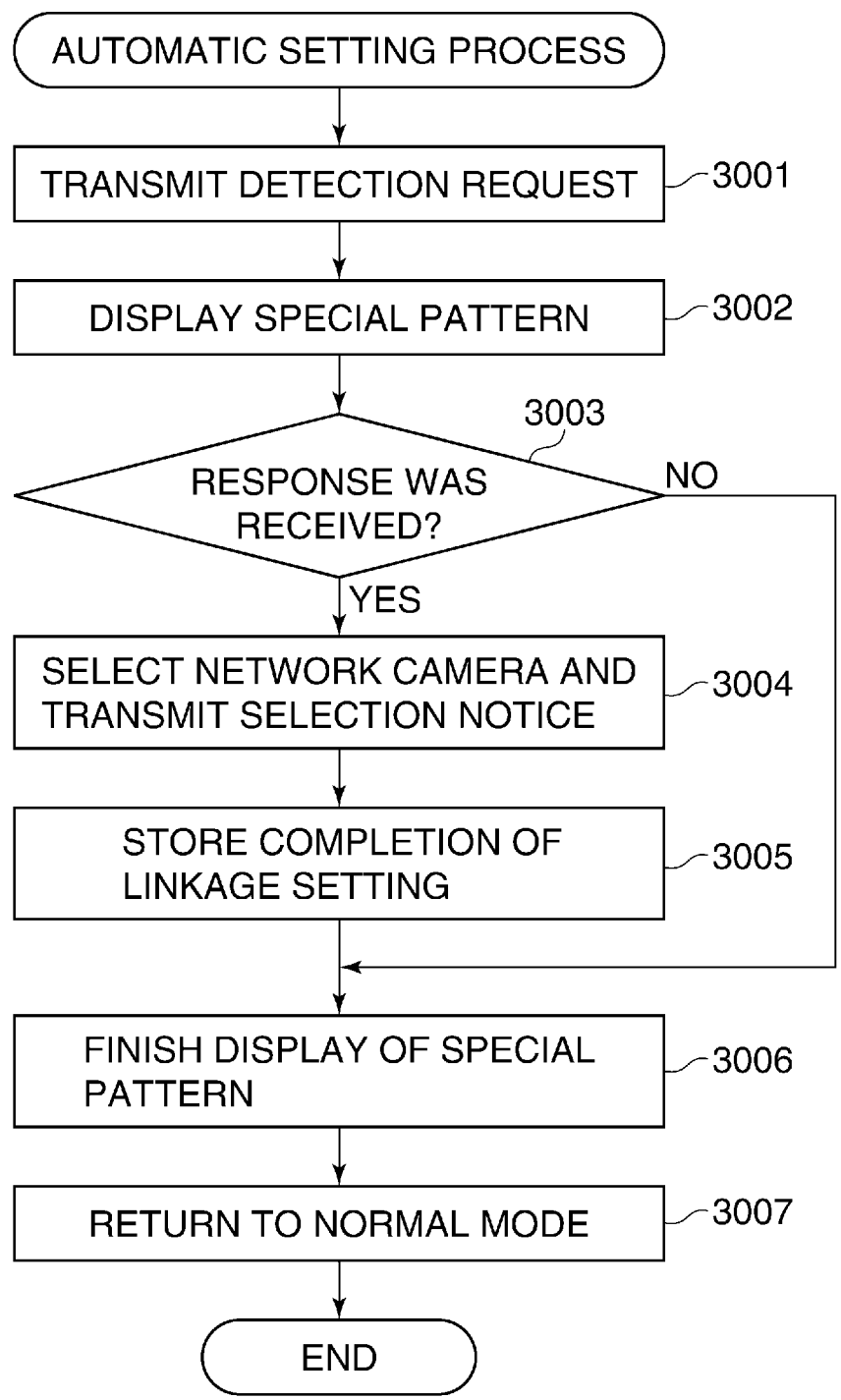
FIG. 7 is a flowchart showing procedures of a modified example of the automatic setting process executed by the CPU of the MFP shown in FIG. 2.

FIG. 7 is a flowchart showing procedures of a modified example of the automatic setting process executed by the CPU 501 of the MFP 100 shown in FIG. 2.

As shown in FIG. 7, when a user instructs the MFP 100 about the linkage setting, the CPU 501 transmits a detection request to the LAN 300 by broadcasting (step 3001). This detection request contains the ID of the special pattern displayed in the following step 3002. Thus, in the modified example, a plurality of special patterns are prepared beforehand, and the ID of the special pattern displayed on the display unit 105 is beforehand transmitted to the network cameras.

Next, the CPU 501 displays the special pattern corresponding to the transmitted ID on the display unit 105 (step 3002). Then, the CPU 501 determines whether a response was received (step 3003). This response includes the image data showing the special pattern as mentioned above.

As a result of the determination in the step 3003, when a response was not received (NO in the step 3003), the process proceeds to step 3006.

On the other hand, as a result of the determination in the step 3003, when the response was received (YES in the step 3003), the CPU 501 makes a user select a network camera used to monitor from among the responded network cameras, and transmits a selection notice to the selected network camera (step 3004).

Here, the CPU 501 interrupts the display of the special pattern on the display unit 105 first, and displays the information about the network cameras together with the image data showing the special patterns transmitted from the network cameras. The CPU 501 transmits the selection notice to the network camera selected by the user from among them.

Moreover, this selection notice notifies the network camera that it is selected as a network camera used to monitor the MFP 100.

Next, the CPU 501 stores the information about the completion of the linkage setting for the selected network camera together with the information identifying the network camera to the HDD 505 (step 3005). Thus, in this modified example, the network camera that was selected by the user from among the responded network cameras is set as a network camera used to monitor the MFP 100.

Furthermore, in this modified example, the CPU 501 displays the information about the network cameras together with the image data showing the special patterns transmitted from the network cameras, when the CPU 501 makes the user select a network camera.

Then, the CPU 501 finishes the display of the special pattern (step 3006), returns to the normal mode (step 3007), and finishes this process.

When only one network camera transmits the response, the network camera concerned is automatically selected because there is no other choice.

FIG. 8 is a flowchart showing procedures of the modified example of the detection process executed by the CPU 601 of the network camera 200 shown in FIG. 3.

This detection process of the network camera 200 forms a pair with the automatic setting process in FIG. 7.

As shown in FIG. 8, when receiving a detection request (step 4001), the CPU 601 starts a detection mode (step 4002). This detection request includes the ID as mentioned above. Then, the CPU 601 detects the special pattern corresponding to the ID in the taken image data in detection mode.

Next, the CPU 601 determines whether the special pattern corresponding to the ID was detected in the taken image data (step 4003).

As a result of the determination in the step 4003, when the special pattern was not detected (NO in the step 4003), the process proceeds to step 4007.

On the other hand, as a result of the determination in the step 4003, when the special pattern was detected (YES in the step 4003), the CPU 601 transmits the response to the MFP 100 (step 4004). This response includes the image data showing the special pattern that is obtained by taking a subject as mentioned above. Moreover, this response is transmitted to the network address of the MFP 100 included in the broadcast packet that the MFP 100 transmitted as with FIG. 6.

Next, the CPU 601 determines whether a selection notice was received (step 4005). As a result of the determination in the step 4005, when a selection notice was not received (NO in the step 4005), the process proceeds to the step 4007.

On the other hand, as a result of the determination in the step 4005, when the selection notice was received (YES in the step 4005), the CPU 601 registers the MFP 100 (step 4004). The registration of the MFP 100 means storing the network address of the MFP 100 to the HDD 605 as a monitoring target as with FIG. 6.

Next, the CPU 601 finishes the detection mode (step 4007), returns to the monitor mode (step 4008), and finishes this process. Thus, in this modified example, when the selection notice showing that the network camera 200 was selected to monitor the MFP 100, was received from the MFP 100, the MFP 100 is set as an MFP that is monitored by the network camera.

According to the processes in FIG. 7 and FIG. 8, even if a plurality of network cameras are able to take a plurality of MFPs, the network camera 200 that monitors the MFP 100 is set up automatically.

As described above, according to the embodiment, since the predetermined special pattern is displayed on the display unit 105 (the step 1002) and the network camera that transmitted the response is set as a network camera used to monitor the MFP (the step 1004) when the response showing that the special pattern was detected is received from the network camera (YES in the step 1003), the setting for the network camera to monitor the MFP 100 is automatically performed.

Moreover, in the embodiment, the network address and the position of in the taken image data of the monitoring target are automatically set up, in a case where the detected position of the MFP 100 is stored.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)*), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-220084, filed Oct. 23, 2013, which is hereby incorporated by reference herein in its entirety.

What is claimed is:

1. An information processing apparatus comprising:
a display device;
a non-transitory computer-readable storage medium storing computer executable instructions; and
a computer communicatively connected to the display device and the non-transitory computer-readable storage medium, the computer configured by the computer executable instructions to:
display a predetermined special pattern via the display device;
receive a response showing that the predetermined special pattern is detected from an image pickup apparatus that detects the predetermined special pattern displayed via the display device; and
set the image pickup apparatus that transmits the response as a selected image pickup apparatus used to monitor the information processing apparatus in a case where the response is received by the computer,
wherein the computer is configured by the computer executable instructions to set the image pickup apparatus as the selected image pickup apparatus in response to the image pickup apparatus being selected by a user from among a plurality of image pickup apparatuses that transmit the response.

2. The information processing apparatus according to claim 1, wherein the computer is configured by the computer executable instructions to display, via the display device, information about the plurality of image pickup apparatuses together with image data showing the predetermined special pattern transmitted from the plurality of image pickup apparatuses, in a case where the image pickup apparatus is selected by the user.

3. The information processing apparatus according to claim 1, wherein the display device is a luminous body.

4. An image pickup apparatus comprising:
a non-transitory computer-readable storage medium storing computer executable instructions; and
a computer communicatively connected to the non-transitory computer-readable storage medium, the computer configured by the computer executable instructions to:
detect a special pattern displayed via a display device of an information processing apparatus in taken image data obtained by taking a subject;
transmit a response showing that the special pattern is detected to the information processing apparatus in a case where the special pattern is detected by the computer; and
register the information processing apparatus to which the response is transmitted as a registered information processing apparatus that is monitored by the image pickup apparatus,
wherein the computer is configured by the computer executable instructions to register the information processing apparatus as the registered information processing apparatus, in a case where the computer receives from the information processing apparatus a notice showing that the image pickup apparatus is selected to monitor the information processing apparatus.

5. An information processing system comprising:
an information processing apparatus that comprises a display device; a first non-transitory computer-readable storage medium storing first computer executable instructions; and a first computer communicatively connected to the display device and the first non-transitory computer-readable storage medium, the first computer configured by the first computer executable instructions to:
display a predetermined special pattern via the display device,
receive a response showing that the predetermined special pattern is detected from an image pickup apparatus that detects the predetermined special pattern displayed via the display device, and
set the image pickup apparatus that transmits the response as a selected image pickup apparatus used to monitor the information processing apparatus in a case where the response is received by the first computer,
wherein the first computer is configured by the first computer executable instructions to set the image pickup apparatus as the selected image pickup apparatus in response to the image pickup apparatus being selected by a user from among a plurality of image pickup apparatuses that transmit the response; and
wherein the information processing system further comprises the image pickup apparatus, which is communicatively connected to the information processing apparatus and comprises a second non-transitory computer-readable storage medium storing second computer executable instructions; and a second computer communicatively connected to the second non-transitory computer-readable storage medium, the second computer configured by the second computer executable instructions to:
detect the predetermined special pattern displayed via the display device in taken image data obtained by taking a subject,
transmit the response to the information processing apparatus in a case where the predetermined special pattern is detected by the second computer, and
register the information processing apparatus to which the response is transmitted as a registered information processing apparatus that is monitored by the image pickup apparatus,
wherein the second computer is configured by the second computer executable instructions to register the information processing apparatus as the registered information processing apparatus, in a case where the second computer receives from the information processing apparatus a notice showing that the image pickup apparatus is selected to monitor the information processing apparatus.

* * * * *